(12) United States Patent
Williams et al.

(10) Patent No.: US 7,510,150 B2
(45) Date of Patent: Mar. 31, 2009

(54) ENERGY RECOVERY APPARATUS AND METHOD

(75) Inventors: Kenneth R Williams, Huntington Beach, CA (US); John B Allen, Long Beach, CA (US)

(73) Assignee: The Boeing Company, Chicago, IL (US)

(*) Notice: Subject to any disclaimer, the term of this patent is extended or adjusted under 35 U.S.C. 154(b) by 416 days.

(21) Appl. No.: 11/237,117

(22) Filed: Sep. 28, 2005

(65) Prior Publication Data

US 2007/0069070 A1 Mar. 29, 2007

(51) Int. Cl.
*B64C 3/50* (2006.01)

(52) U.S. Cl. .................................. 244/211; 244/213

(58) Field of Classification Search ................ 244/211, 244/212, 215, 99.5, 99.6, 78.1
See application file for complete search history.

(56) References Cited

U.S. PATENT DOCUMENTS

| | | | |
|---|---|---|---|
| 2,309,703 A | 1/1943 | Lovell et al. | |
| 2,720,368 A | 10/1955 | Payne | |
| 2,817,483 A * | 12/1957 | Hill | 244/82 |
| 3,336,529 A | 8/1967 | Tygart | |
| 3,456,134 A | 7/1969 | Ko | |
| 3,457,463 A | 7/1969 | Balamuth | |
| 3,466,473 A | 9/1969 | Rhoten | |
| 3,553,588 A | 1/1971 | Honig | |
| 3,624,451 A | 11/1971 | Gauld | |
| 4,467,236 A | 8/1984 | Kolm et al. | |
| 4,510,484 A | 4/1985 | Snyder | |
| 4,595,158 A * | 6/1986 | Robinson | 244/99.14 |
| 4,773,620 A * | 9/1988 | Seidel | 244/99.2 |
| 4,947,074 A | 8/1990 | Suzuki | |
| 5,126,589 A | 6/1992 | Renger | |
| 5,208,505 A | 5/1993 | Mitsuyasu | |
| 5,431,015 A * | 7/1995 | Hein et al. | 60/581 |
| 5,463,374 A | 10/1995 | Mendez et al. | |
| 5,703,474 A | 12/1997 | Smalser | |

(Continued)

OTHER PUBLICATIONS

U.S. Appl. No. 29/237,324, Thomas L Rainey, Block Design for Retaining Wall, Filing Date Aug. 30, 2005.

(Continued)

*Primary Examiner*—Tien Dinh
(74) *Attorney, Agent, or Firm*—Harness, Dickey & Pierce, P.L.C.

(57) ABSTRACT

An energy recovery and storage apparatus especially well adapted for use with flight control surfaces on airborne mobile platforms, such as aircraft. In one form the apparatus includes a ram-like element coupled to a portion of a flight control surface. An accumulator holds a flexible container having a compressible medium contained within the flexible container. The accumulator is in fluid communication with a housing of the ram-like element. When the flight control surface is moved from a deployed to a retracted position, the energy acting on the surface is recovered and stored in the compressible medium as the ram-like element forces fluid from its housing into the accumulator. When the flight control surface is to be deployed again in a subsequent cycle, the stored energy in the compressible medium is used to urge the ram-like element into an extended position, thus assisting in deploying the flight control surface. The various preferred embodiments all enable lower power, smaller and less expensive actuators to be used to control a flight control surface.

6 Claims, 3 Drawing Sheets

U.S. PATENT DOCUMENTS

| | | | |
|---|---|---|---|
| 5,751,091 | A | 5/1998 | Takahashi et al. |
| 5,801,475 | A | 9/1998 | Kimura |
| 5,856,722 | A | 1/1999 | Haronian et al. |
| 5,969,954 | A | 10/1999 | Zaitsu |
| 6,065,934 | A | 5/2000 | Jacot et al. |
| 6,147,433 | A | 11/2000 | Reineke et al. |
| 6,306,773 | B1 | 10/2001 | Adas et al. |

OTHER PUBLICATIONS

U.S. Appl. No. 29/237,374, Thomas L. Rainey, Block Design for Retaining Wall, Filing Date Aug. 30, 2005.

U.S. Appl. No. 29/237,344, Thomas L. Rainey, Block Design for Retaining Wall, Filing Date Aug. 30, 2005.

XP-002288947, Muneo Harada et al., "Fish-bone structured acoustic sensor toward silicon cochlear systems", Sep. 1998 (5 pgs).

Meteer, Jami, Front-Side Processing of a Piezoelectric MEMS Accelerometer, The Pennsylvania State University National nanofabrication users Network, pp. 48-49.

Kloeppel, James E., Residual stress in piezoelectric ceramics can be reduced, put to work, News Bureau (Sep. 1, 2000).

John Kymissis, Clyde Kendall, Joseph Paradiso, Neil Gershenfeld, "Parasitic Power Harvesting in Shoes", Aug. 1998, p. 1-8.

F.J. von Preissig and E.S. Kim, topics in Finite-Element Modeling of Piezoelectric MEMS.

* cited by examiner

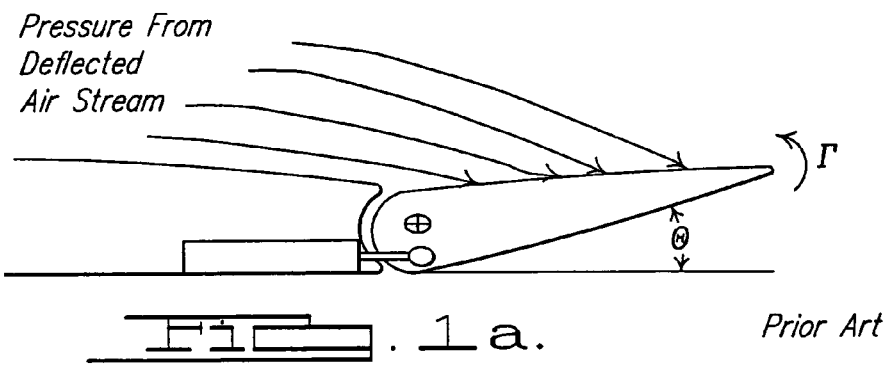
FIG. 1a. *Prior Art*
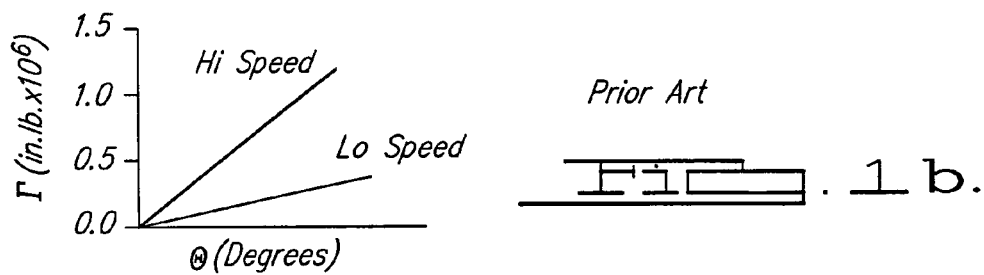
FIG. 1b. *Prior Art*
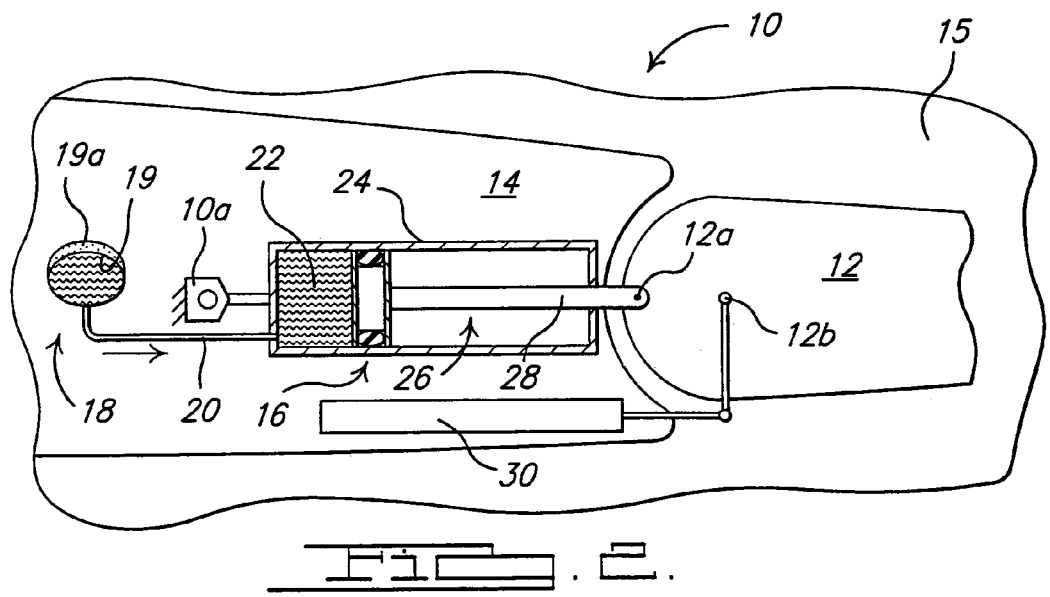
FIG. 2.
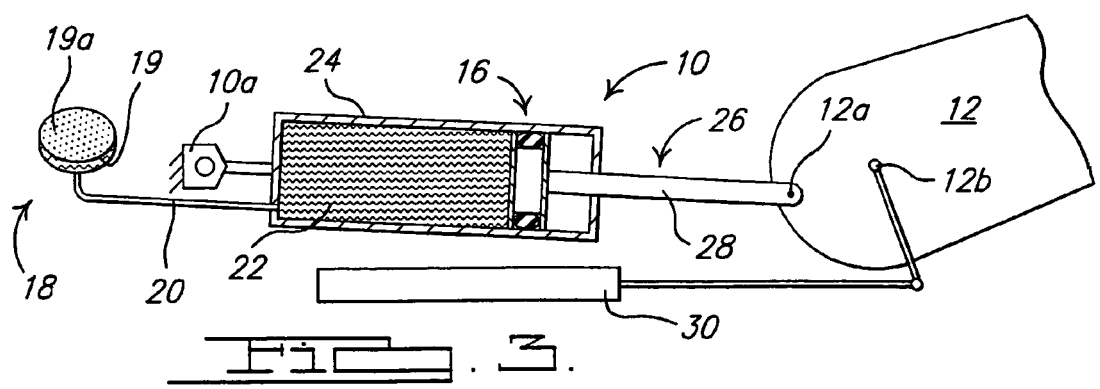
FIG. 3.

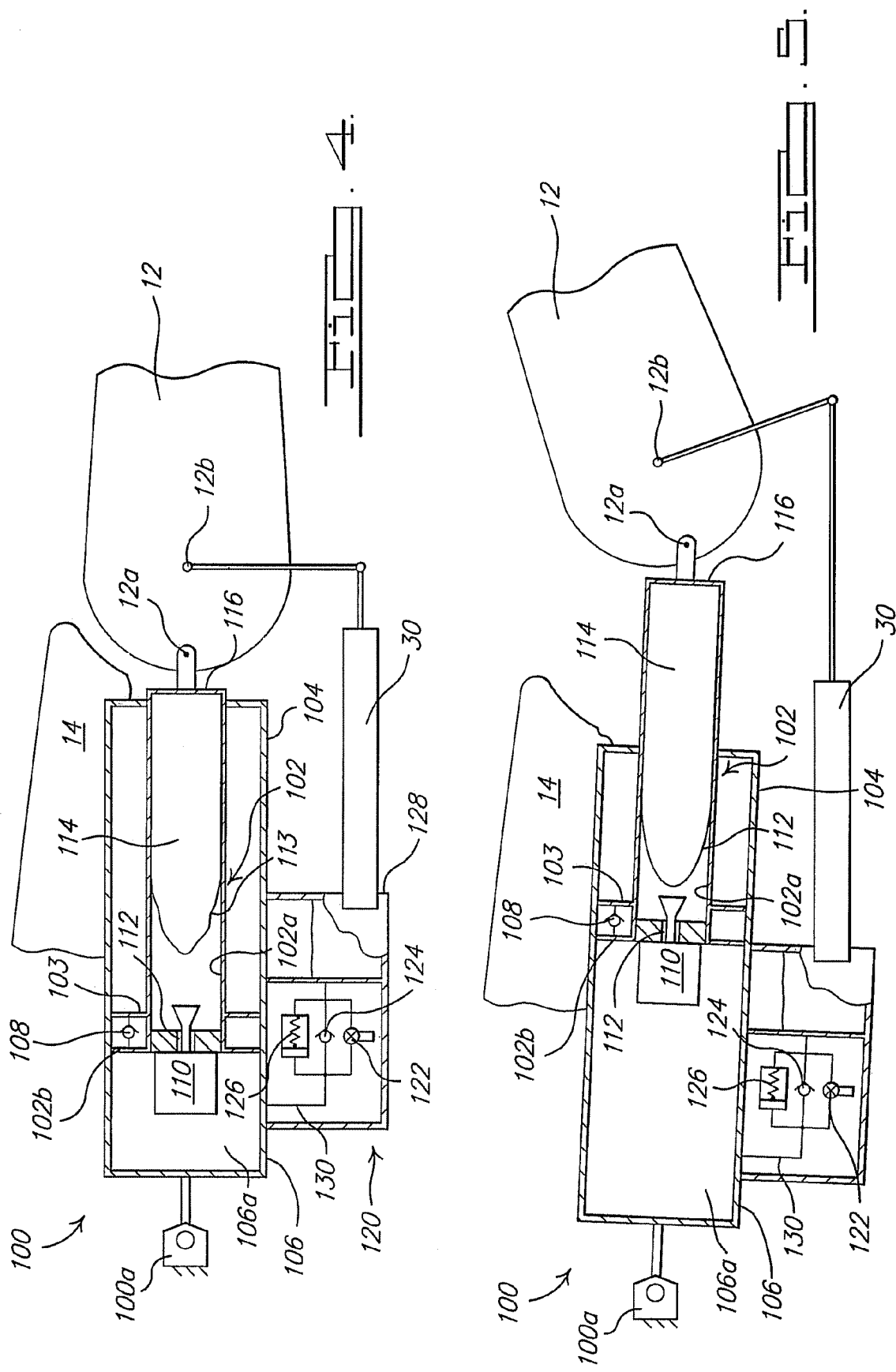

ENERGY RECOVERY APPARATUS AND METHOD

CROSS-REFERENCE TO RELATED APPLICATIONS

The present application is related in general subject matter to U.S. application Ser. No. 10/909,784 filed Jul. 30, 2004, and assigned to the Boeing Company, the disclosure of which is hereby incorporated by reference into the present application.

FIELD

The present disclosure relates to energy recovery apparatuses and methods, and more particularly to an energy recovery apparatus and method especially well adapted to move a flight control surface on an airborne mobile platform, such as an aircraft, in a manner that recovers and reuses energy from the control surface as the control surface is moved from deployed to retracted positions.

BACKGROUND

Early aircraft were controlled by either warping the wings or by moving separate small control surfaces directly through cables or linkage directly connected to the pilot's control stick. Large control surfaces were sometimes "aerodynamically balanced" by means of a portion of the control surface panel being extended forward of the hinge point on the control surface. The increased speed and size of later developed aircraft caused the control surface loads to become sufficiently large that the effort available from the pilot was not sufficient to control the aircraft. This in turn led to the development of various types of hydraulic and electric power arrangements to move the larger control surfaces.

In general, the forces on an aircraft control surface panel are caused by the deflection of the panel into an air stream. The pressure of the moving air stream against the surface of the control panel results in a "moment" about the control panel hinge that must be provided for by the control panel actuator. This moment is often called the "hinge moment" or the "aerodynamic moment." This moment is generally proportional to the deflection angle of the control panel for a given flight speed. However, for a given deflection angle of the control panel into the air stream, the moment on the panel is a function of the square of the aircraft speed. Thus, a panel actuation system may be designed for a load at a relatively low speed and high deflection (e.g., 30°); but when operating at a higher speed, the actuation system may experience the same load at a much lower deflection angle of the control panel (e.g., 10°).

Referring to FIG. 1a, a control surface and simple actuator is illustrated to help understand the power needed to deflect the control panel. The power required to deflect the control panel is a function of the hinge moment ($\Gamma$) and the rate of motion of the panel into the air stream. The hinge moment is proportional to the deflection angle ($\Theta$), although not necessarily in a linear relationship as illustrated in the graph of FIG. 1b.

When the control panel is being deflected into the air stream, the hinge moment and power are supplied by the actuator. In this instance work is being done on the control panel. When the control panel is returned to the neutral position (e.g., zero deflection angle), the actuator restrains and controls the control panel, and work is done by the control panel on the actuator. The actuator system has no means to recover this "aiding load" energy when the control panel is returned to the neutral position. Furthermore, in the case of an hydraulic actuation system, not only is the "aiding load" energy not recovered, but also additional energy is required from the hydraulic power system to fill a low pressure side of the actuator when the control panel is returned to the neutral position. With a conventional hydraulic actuator which is designed to provide the maximum anticipated hinge moment, the power consumed by the actuator is only a function of the rate of motion and the maximum design moment, not the prevailing hinge moment or the direction of motion.

Since the external loads (i.e., the air stream) on the control panel always tend to act in a direction to restore the control panel to its neutral position, it would be highly desirable to provide some system and method for recovering and storing the energy that is effectively imparted to the control panel by the air stream when the control panel is allowed to return to its neutral position. It would also be highly useful if such a system and method could be employed to assist in deploying the control panel back into the air stream when deployment of the control panel is required. Such a system and method would not only recover the "aiding load" energy that is presently wasted, but the hinge moment provided by such a system and method could be used to provide a portion of the maximum design hinge moment during any subsequent deployment of the control panel. This would allow the actuator used with the control panel to be reduced in size, and would thus reduce the power needing to be delivered to the actuator(s) at any motion and angular speed of its associated control panel.

SUMMARY

The present disclosure is directed to an energy recovery apparatus and method for recovering and storing energy imparted to a moving element, and using the stored energy to assist in moving the element in a subsequent operation. In one preferred form the system and method of the present disclosure is especially well suited for use with a flight control surface of an airborne mobile platform such as an aircraft.

The system and method of the present disclosure, in one preferred form, makes use of a movable element that is associated with a compressible medium. The compressible medium is configured to act on the movable element, which in turn acts on a movable control surface, such that it is able to assist the control surface in deploying when such deployment is required. However, when the control surface is retracted into a neutral position from a deployed position, the compressible medium is compressed, thus recovering and storing the energy imparted by the air stream or other form of load being exerted on the control surface. In a subsequent operation, the energy stored in the compressible medium may be used to assist in deploying the control surface into its deployed position.

In one preferred implementation, the energy recovery system includes a ram-like system having a piston element movable within a housing. A bladder for holding a compressible medium is contained within a portion of the piston. The piston is also in flow communication with a reservoir containing a flowable medium. A portion of the piston is coupled to the flight control surface.

When the flight control surface is moved from its deployed to its retracted position, energy is stored in the compressible medium within the bladder. The flowable medium adjacent the piston is partially displaced from within the reservoir into the housing as the bladder is compressed and the piston is retracted. When the control surface is deployed, the compressible medium expands the bladder and forces the flowable medium from the interior of the housing into the reservoir as the piston extends. This cycle is repeated each time the control surface is retracted and deployed.

Further areas of applicability of the present disclosure will become apparent from the detailed description provided hereinafter. It should be understood that the detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1a is a prior art view of a control panel for a wing of an airborne mobile platform, wherein the wing includes an actuator;

FIG. 1b is a graph illustrating the hinge moment in relation to the speed of the air stream acting on the control panel and the depletion of the panel;

FIG. 2 is a schematic diagram of an energy recovery apparatus in accordance with a embodiment of the present disclosure, showing the apparatus coupled to a control surface of an airborne mobile platform; and FIG. 3 is a view of the apparatus of FIG. 2 but with the apparatus urging the flight control surface into a deployed position;

FIG. 4 is a view of an alternative embodiment of the present disclosure coupled to a flight control surface of an airborne mobile platform;

FIG. 5 is a view of the apparatus of FIG. 4 but with a piston of the apparatus extended to deploy the flight control surface.

DETAILED DESCRIPTION OF THE EMBODIMENTS

Figure 6:
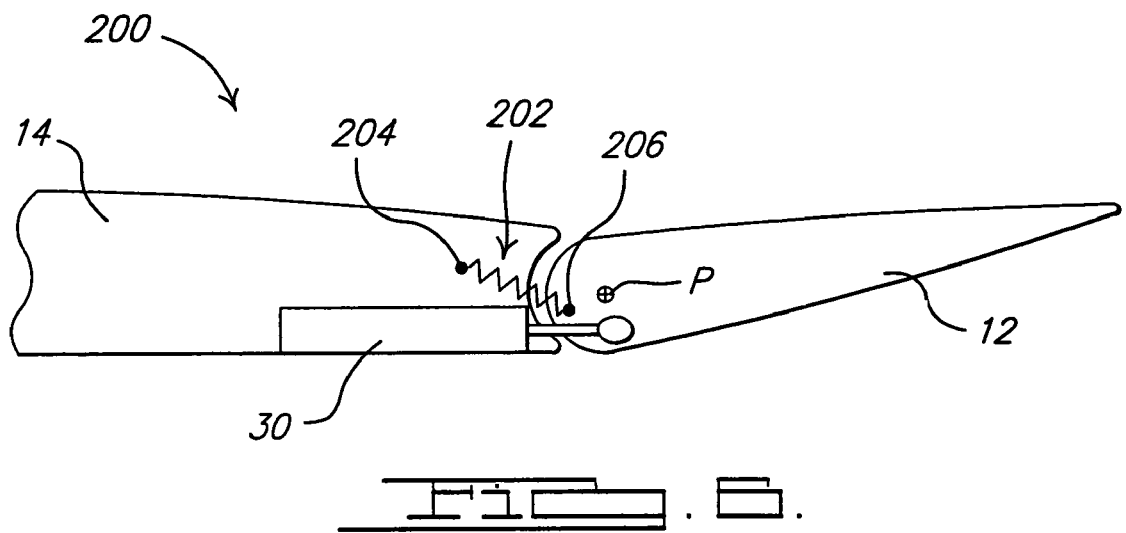
FIG. 6 is an alternative embodiment of the present disclosure incorporating a spring.

The following description of the various embodiment(s) is merely exemplary in nature and is in no way intended to limit the disclosure, its application, or uses.

Referring to FIG. 2, an energy recovery and storage apparatus 10 in accordance with an embodiment of the present disclosure is shown. In this example the apparatus 10 is used to move a flight control surface 12 of a wing 14 of a mobile platform 15. The apparatus generally includes a single-acting ram 16 in communication with an accumulator 18 via a conduit 20. The accumulator 18, in this example, is a gas/oil accumulator that functions as a reservoir to store a flowable medium such as a fluid 22, and to permit flow of the fluid 22 through conduit 20 into the ram 16 housing 24. The gas/oil accumulator 18 includes a flexible container, in this example a bladder 19, for holding a quantity of compressible medium 19a. The compressible medium 19a may be a compressible gas or a compressible liquid, a compressible medium having both liquid and gas properties (e.g., Freon), or any other form of compressible medium/fluid. The ram 16 further includes a piston 26 having a member 28 that is coupled at one end to a pivot point 12a of the flight control surface 12. In this example, the member 28 is also longitudinally aligned with a pivot point 12b of the flight control surface 12. In FIG. 2, the flight control surface 12 is shown in its neutral or retracted position. FIG. 3 illustrates the flight control surface 12 in its fully deployed position.

When the flight control surface 12 is in the neutral position, an attachment point 10a, the member 28 pivot point 12a to the flight control surface 12, and the pivot point 12b lie along a common line. Thus, even though the member 28 is tending to extend, there is no moment produced about the pivot point 12b until the flight control surface 12 is urged in either direction away from the neutral position.

When the actuator 30 is commanded to deploy the flight control surface 12 to a position away from neutral, the actuator is able to start the motion because the aerodynamic hinge moments are low when the flight control surface is near the neutral position. As the flight control surface 12 moves away from the neutral position in either direction, the pivot point 12a of the member 28 to the flight control surface 12 moves above or below the pivot point 12b, thus creating a lever arm corresponding to the perpendicular distance between the longitudinal center line of the apparatus 10 and the pivot point 12b of the control surface. This lever arm continues to increase with increasing deflection of the flight control surface 12. This increase in the lever arm with increasing flight control surface deflection then offsets the increase in aerodynamic hinge moment that occurs as the flight control surface 12 is deployed further into the air stream. In this operation then, the apparatus 10 assists the conventional actuator 30 in the full deployment of the flight control surface 12 into the air stream.

When the flight control surface 12 is moved from its deployed position in FIG. 3 into its neutral (i.e., retracted) position in FIG. 2, the force of the air stream acting on the flight control surface 12 is recovered in the compressible medium 19a as the piston 26 is retracted within the housing 24 of the ram 16 by the force of the flight control surface 12. This forces the fluid 22 from the interior of the housing 24 into the gas/oil accumulator 18. Thus, the energy acting on the flight control surface 12 is transferred through the piston 26 and fluid 22 and stored in the compressible medium 19a.

When the flight control surface 12 is to be deployed, the actuator 30 associated with the flight control surface 12 is actuated to initiate movement of the flight control surface 12 toward its deployed position. This allows the energy stored in the bladder 19 to be released, thus causing the fluid 22 in the gas/oil accumulator 18 to be transferred into the ram 16, thus driving the piston 16 outwardly in FIG. 4. Thus, the bladder 19 functions as somewhat of a "spring" to store energy acting on the flight control surface 12 when it is moved from its deployed to its retracted position, and then using the energy to assist in deploying the flight control surface 12 in a subsequent cycle.

A principal advantage of the system 10 is that a smaller, less powerful and less expensive actuator is required to deploy the flight control surface 12. Another advantage of the system 10 is that by changing either the volume of the fluid 22 or the compressible medium 19a, or both, the shape of a non-linear pressure/stroke produced by the apparatus 10 can be adjusted to suit changing flight conditions. For example, two different pressure/stroke curves could be implemented for two different air speeds. Also, while the use of only one gas/oil accumulator is shown, it will be appreciated that a plurality of apparatuses 10 could also be served by a central supply of a compressible medium (e.g., a compressed gas). This could also be used to compensate for any slight leakage of the compressible medium so as to maintain the proper mass of gas in the bladder 19 of each apparatus 10.

Figure 7:
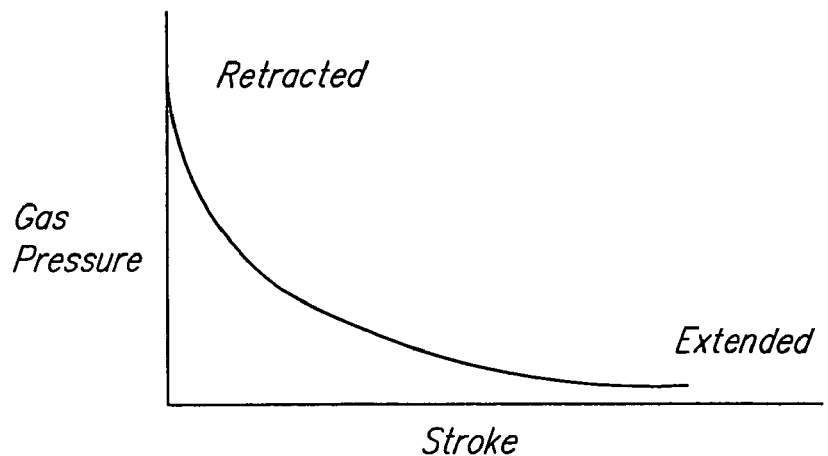
FIG. 7 is an exemplary graph of gas pressure versus stroke length for the apparatus discussed in connection with FIGS. 2 and 3.

An exemplary pressure/stroke graph for the apparatus is shown in FIG. 7. From FIG. 7, it can be seen that the gas pressure does not drop linearly in relation to the length of the stroke of the piston 26. However, the pressure/stroke curve of FIG. 7 can be readily modified, as explained above, simply by controlling the volume of the fluid 22, the compressible medium 19a, or both, as needed.

Referring now to FIGS. 4 and 5, an energy recovery apparatus 100 in accordance with another embodiment of the present disclosure is shown. The apparatus 100 includes a ram-like element 102 within a tubular housing 104. The housing is pivotally attached at a point 100a to a suitable structure. A portion of the tubular housing 104 forms a fluid reservoir 106 for holding a flowable medium such as a fluid 106a. The ram-like element 102 essentially forms a piston having a one-way check valve 108 integrated into a head portion 103. A valve 110 is also disposed within the fluid reservoir 106 and communicates via a port 112 in a portion of the ram-like element 102 with an interior area 102a of the element 102. The valve 110 may comprise a solenoid valve or a mechanically actuated valve, or any other suitable valve, that is able to control the fluid 106a flow between the fluid reservoir 106 and the interior area 102a of the ram-like element 102.

Within the ram-like element 102 is a flexible container, for example a bellows or a bladder 113. For convenience, this component will be referred to throughout as a bladder. The bladder 113 holds a compressible medium 114, for example a compressible gas or liquid or other suitable compressible medium.

In one implementation of the apparatus 100 an optional manifold 120 is also included. The manifold 120 includes a selectively controllable valve 122, for example a solenoid valve, as well as a one-way check valve 124 and a pressure relief valve 126. The manifold 120 also includes a service reservoir 128. The interior of the service reservoir 128 is in communication with fluid reservoir 106 via a conduit or branch line 130. The valves 122, 124 and 126 control the flow of fluid 106a between the service reservoir 128 and the conduit 130, as will be explained in greater detail momentarily.

In operation, when the flight control surface 12 is moved from the position shown in FIG. 5 into that shown in FIG. 4, the compressible medium 114 in the bladder 113 is compressed as the ram-like element 102 is retracted, and the fluid 106a is forced from the fluid reservoir portion 106 into the interior area 102a of the ram-like element 102. Thus, the energy acting on the flight control surface 12 to move it back into its neutral position is effectively stored in the compressible medium 114 within the bladder 113.

When the flight control surface 12 is to be urged into its deployed position, as shown in FIG. 5, actuator 30 is used to initiate this movement of the flight control surface 12. Movement of the ram-like element 102 towards its deployed position allows the compressed bladder 113 to expand as fluid 106a is forced from the interior area 102a of the ram-like element 102 into the fluid reservoir portion 106 of the tubular housing 104. This force assists in urging the flight control surface 12 into the deployed position shown in FIG. 5. If it is desired to limit the stroke length of the ram-like element 102, the valve 110 can be closed at a predetermined point during the extension of the ram-like element 102, which would prevent the bladder 113 from expanding further by closing off the fluid flow path from the interior area 102a of the ram-like element 102.

When the flight control surface 12 is again urged back into its neutral or retracted position (FIG. 4), the above-described operation is repeated. The bladder 113 is again compressed as fluid 106a within the fluid reservoir portion 106 is forced back into the interior area 102a of the ram-like element 102 and stored within the bladder 113. Tailoring the system 100 by controlling the volume/type of compressible medium 114 used, as well as the volume/type of fluid 106a employed, allows the force required to fully retract the ram-like element 102 to be carefully tailored so that only a small degree of force is thereafter required from the actuator 30 to deploy the flight control surface 12.

One-way check valve 108 is purely optional, but allows any fluid 106a that leaks past head portion 103 of the ram-like element 102 to flow back into the fluid reservoir portion 106.

Referring further to FIGS. 4 and 5, the manifold 120 help to enable various functions related to operation and servicing of the apparatus 100. For example, when valve 110 is closed to prevent fluid 106a flow between the fluid reservoir portion 106 and the interior are 102a of the ram-like element 102, valve 122 may be opened to allow fluid 106a in the fluid reservoir portion 106 to be drained into the service reservoir 128. This allows the ram-like element 102 to move freely within tubular the housing 104 without impeding motion of the flight control surface 12. This allows the flight control surface 12 to be manipulated more easily for service purposes. When the valve 110 is opened, the valve 122 may be closed and fluid 106a in the service reservoir 128 may be drawn through the check valve 124 into the fluid reservoir portion 106. Under these conditions, the fluid can also be returned to the service reservoir 128 through the pressure relief valve 126. This mode can be used to fill and charge the fluid reservoir portion 106 and the interior area 102a of the ram-like 102 element for the normal function of assisting the actuator 30 in deploying the flight control surface 12, and then storing energy upon retraction of the flight control surface 12. As with apparatus 10, a central gas reservoir could be implemented to serve several of the apparatuses 100. Also, a central fluid reservoir could be used to supply a slightly pressurized fluid to the service reservoir 128 of a plurality of the apparatuses 100.

Referring briefly to FIG. 6, a system 200 in accordance with an alternative embodiment of the present disclosure is shown. System 200 essentially comprises a spring 202 that is coupled at a first end 204 to a portion of a structure, for example, a wing, and a second end 206 that is coupled to an element that requires controlled movement, for example the flight control surface 12. The actuator 30 is used to initiate movement of the flight control surface 12 between its deployed and retracted positions. The spring 202 may be formed by either a coil spring or any type of torsion element, for example a torsion bar or element. The spring 202 functions as an energy storage device to store energy acting on the flight control surface 12 when the surface is retracted (i.e., moved into its neutral position). The spring 202 essentially serves as an energy balance/recovery device, and further is arranged to provide an over-center biasing action on the flight control surface 12. By "over-center" it is meant that the spring 202 has its ends 204 and 206 coupled to points of the wing 14 and flight control surface 12 such that when the flight control surface 12 is in its retracted or neutral position, the biasing force of the spring 202 is acting directly against the pivot point "P." With the flight control surface 12 in this orientation, the biasing force of the spring 202 is neutralized. However, once the actuator 30 starts to move the flight control surface 12 towards its deployed position, the over-center orientation of the spring 202 quickly begins to exert its stored energy on the flight control surface 12 to assist in urging it into the deployed position.

The various embodiments of the present disclosure described herein all enable the energy acting on a movable element that is being moved from a first position into a second position to be stored, and then used to assist in moving the element from the second position back into the first position. While the various embodiments have been described in connection with a pivotally mounted flight control surface, it will be appreciated that the various embodiments can be used with linearly moveable elements as well, or with elements that are moved along paths that are partially linear and partially arcuate. The present disclosure is expected to find utility in any application where an opportunity is presented to store energy acting on a movable element when the element is moved between first and second positions, and then required to be moved back from the second position into the first position. In aircraft and aerospace applications, the present disclosure enables smaller, lighter, less powerful and less expensive actuators to be employed to move various flight control surfaces. Importantly, the various embodiments enable much larger control surfaces on advanced aircraft to be controlled, where such large control surfaces would have otherwise required the use of exceedingly large actuators with impractically large power requirements.

While various embodiments have been described, those skilled in the art will recognize modifications and/or variations in mounting the apparatus 10 can be made without departing from the inventive concept. The examples illustrate the disclosure and are not intended to limit it. Therefore, the description and claims should be interpreted liberally with only such limitation as is necessary in view of the pertinent prior art.

What is claimed is:

1. An energy recovery apparatus for recovering energy from a flight control element, and assisting in moving said flight control element through the use of the recovered energy, comprising:
    a single-acting, ram-like system having a piston operably associated with the flight control element and movable in response to movement of said flight control element;
    a compressible medium in communication with the ram-like system, the compressible medium able to store energy acting on the piston when the flight control element is moved in a first direction, thus causing the piston to be moved in said first direction, said stored energy being usable by the ram-like system to assist in moving the flight control element in a second direction, wherein the flight control element is extended aft in a longitudinal direction; and
    wherein said piston is moved in said first direction into a retracted position solely by a force exerted by said flight control element as said flight control element moves in said first direction.

2. The apparatus of claim 1, wherein the compressible medium comprises a gas.

3. The apparatus of claim 1, wherein the compressible medium comprises a fluid.

4. The apparatus of claim 1, wherein the compressible medium comprises a medium having both liquid and gas properties.

5. The apparatus of claim 1, further comprising an actuator for initiating movement of said working element in said second direction.

6. An energy recovery apparatus for recovering energy from a flight control element located in a flight surface of an airborne mobile platform, and assisting in moving said flight control element through the use of the recovered energy, comprising:
    a single-acting ram-like system having a piston operably associated with the flight control element and movable in response to movement of said flight control element;
    a compressible medium used in the ram-like system, the compressible medium able to store energy acting on the piston via the flight control element when the flight control element is moved in a first direction, said stored energy being usable by the ram-like system to assist in moving the flight control element in a second direction, wherein the flight control element is extended aft in a longitudinal direction; and
    wherein said piston is moved in said first direction into a retracted position by a force exerted by said flight control element as said working element moves in said first direction.

* * * * *